United States Patent
Gentile

(10) Patent No.: US 11,415,967 B2
(45) Date of Patent: Aug. 16, 2022

(54) METHOD FOR ASSEMBLING A COOLING APPARATUS, AN ASSEMBLING LINE IMPLEMENTING THE SAME, AND A COMPARTMENT OF SAID COOLING APPARATUS

(71) Applicant: Electrolux Appliances Aktiebolag, Stockholm (SE)

(72) Inventor: Marco Gentile, Porcia (IT)

(73) Assignee: Electrolux Appliances Aktiebolag

( * ) Notice: Subject to any disclaimer, the term of this patent is extended or adjusted under 35 U.S.C. 154(b) by 140 days.

(21) Appl. No.: 16/636,161

(22) PCT Filed: Aug. 4, 2017

(86) PCT No.: PCT/EP2017/069790
§ 371 (c)(1),
(2) Date: Feb. 3, 2020

(87) PCT Pub. No.: WO2019/025003
PCT Pub. Date: Feb. 7, 2019

(65) Prior Publication Data
US 2020/0371505 A1 Nov. 26, 2020

(51) Int. Cl.
*G05B 19/418* (2006.01)
*F25D 23/06* (2006.01)

(52) U.S. Cl.
CPC ..... *G05B 19/41805* (2013.01); *F25D 23/066* (2013.01); *F25D 2700/08* (2013.01);
(Continued)

(58) Field of Classification Search
CPC .... G05B 19/41805; G05B 2219/36371; G05B 2219/40111; G05B 2219/40543
(Continued)

(56) References Cited

U.S. PATENT DOCUMENTS 9,908,239 B1 * 3/2018 O'Brien ............... G05D 1/0282
2008/0103622 A1   5/2008 Hanses et al.
(Continued)

FOREIGN PATENT DOCUMENTS

CN      102292194      * 12/2011
CN      104772289 A       7/2015
(Continued)

OTHER PUBLICATIONS

Chinese Office Action for Chinese Application No. 201780093094.3, dated Jan. 6, 2021, 10 pages.
(Continued)

*Primary Examiner* — Hien D Khuu
(74) *Attorney, Agent, or Firm* — RatnerPrestia

(57) ABSTRACT

A method for assembling a cooling apparatus having a cabinet which houses an inner casing defining at least one compartment for the storage of products to be cooled and one or more objects configured to be connected to the inner casing. The method includes: providing the inner casing; automatically univocally identifying the model of the inner casing among various known inner casing models by using a detecting device and performing a step of connecting the one or more objects to the inner casing based on the model of inner casing identified in the identifying step.

16 Claims, 7 Drawing Sheets

(52) U.S. Cl.
CPC ............. *G05B 2219/36371* (2013.01); *G05B 2219/40111* (2013.01); *G05B 2219/40543* (2013.01)

(58) Field of Classification Search
USPC ........................................................ 700/115
See application file for complete search history.

(56) References Cited

U.S. PATENT DOCUMENTS

| | | | | |
|---|---|---|---|---|
| 2011/0087360 | A1* | 4/2011 | Chen | B25J 9/1697 |
| | | | | 700/114 |
| 2013/0004289 | A1* | 1/2013 | Gaudette | B65G 47/904 |
| | | | | 414/807 |
| 2014/0375191 | A1* | 12/2014 | Hoashi | F25D 29/008 |
| | | | | 312/237 |
| 2016/0210485 | A1 | 7/2016 | Perry | |
| 2022/0089237 | A1* | 3/2022 | Sverdlov | G05B 19/41895 |

FOREIGN PATENT DOCUMENTS

| | | | |
|---|---|---|---|
| CN | 105059854 | A | 11/2015 |
| CN | 204818695 | U | 12/2015 |
| CN | 105883280 | * | 8/2016 |
| CN | 105883280 | A1 | 8/2016 |
| CN | 106568254 | A2 | 4/2017 |
| DE | 102012223547 | A1 | 6/2014 |
| DE | 202014005873 | U1 | 9/2014 |
| EP | 1239720 | A2 | 9/2002 |
| FR | 2964485 | A1 | 3/2012 |
| FR | 2964485 | * | 8/2012 |
| JP | 2005112102 | A | 4/2005 |
| JP | 4035900 | * | 1/2008 |
| KR | 20140078427 | * | 6/2014 |
| KR | 20140078427 | A | 6/2014 |
| WO | WO 2000/019794 | * | 4/2000 |
| WO | 0224040 | A2 | 3/2002 |
| WO | 2009019268 | A2 | 2/2009 |
| WO | 2019025003 | A1 | 2/2019 |

OTHER PUBLICATIONS

Chinese Office Action for Chinese Application No. 201780093094.3, dated Jun. 28, 2021 with translation, 14 pages.
International Search Report and Written Opinion for International Application No. PCT/EP2017/069790, dated Nov. 2, 2017, 12 pages.
European Communication pursuant to Article 94(3) for European Application No. 17 755 440.9, dated Apr. 8, 2022, 7 pages.

* cited by examiner

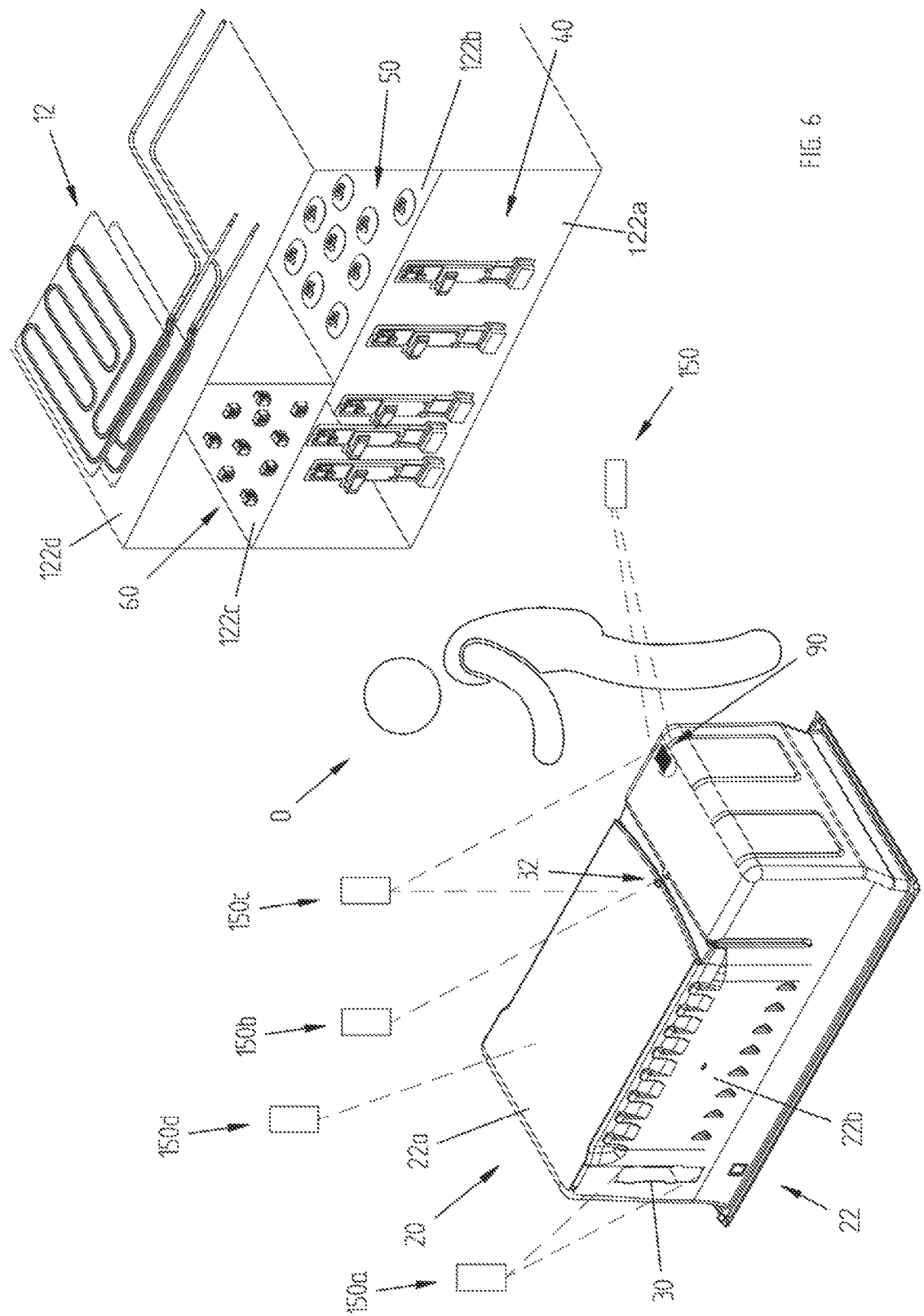

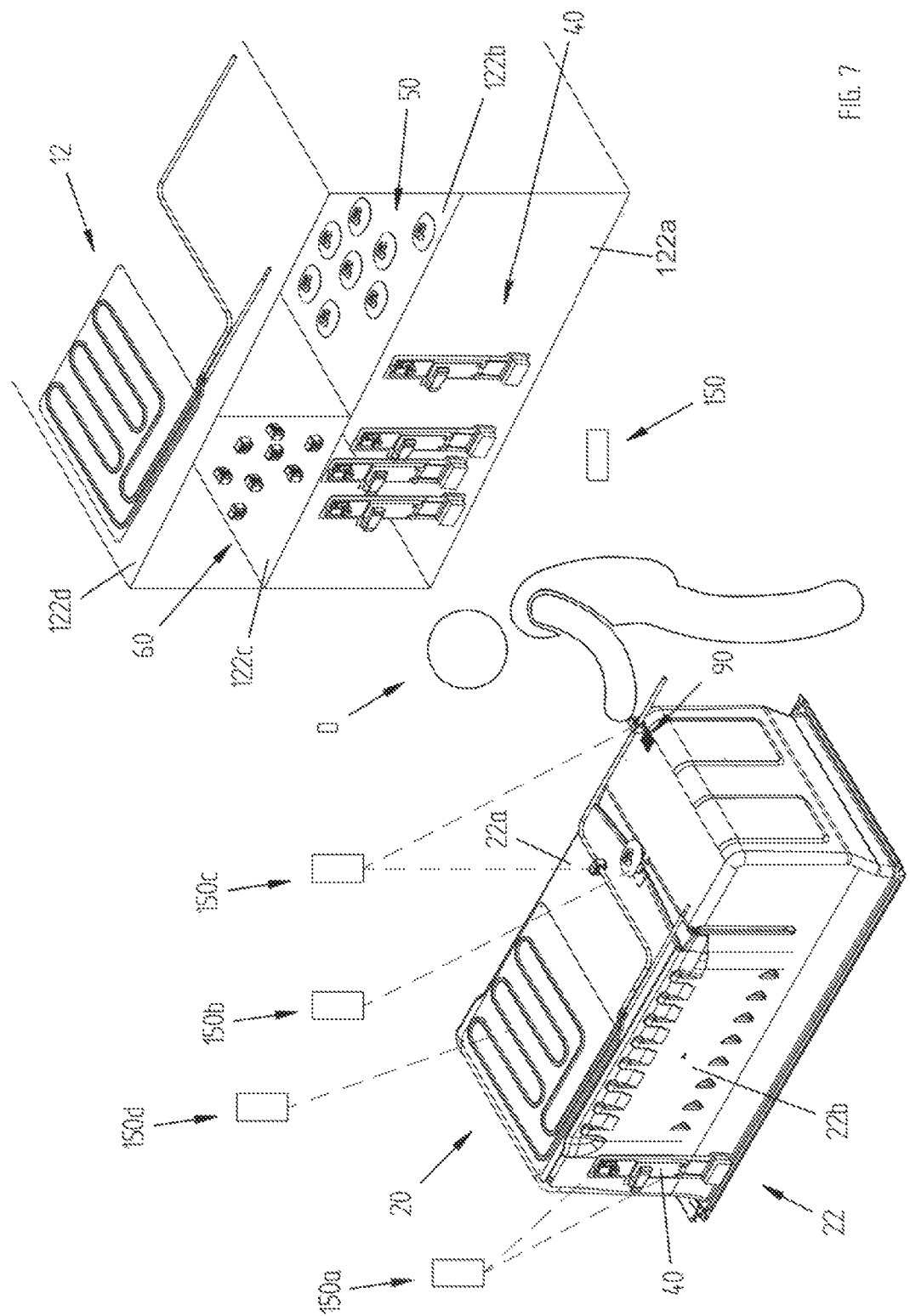

METHOD FOR ASSEMBLING A COOLING APPARATUS, AN ASSEMBLING LINE IMPLEMENTING THE SAME, AND A COMPARTMENT OF SAID COOLING APPARATUS

This application is a U.S. National Phase application of PCT International Application No. PCT/EP2017/069790, filed Aug. 4, 2017, which is incorporated by reference herein.

The present invention generally relates to cooling apparatuses, particularly for food and beverage storage, such as refrigerators and/or freezers, preferably for domestic use.

More specifically, the present invention relates to a method for assembling a cooling apparatus.

The invention also relates to an assembling line implementing the method.

The invention further relates to a compartment of said cooling apparatus.

BACKGROUND ART

Refrigerators for foods and beverages generally comprise a cabinet, or outer casing, which houses at least one refrigerator compartment for storing the articles to be kept cool, like for example vegetables, fruit, dairy products, meat, beverages in bottles or cans. The refrigerator compartment is open frontally, or at the top, and a door enables access to the interior of the compartment.

Typically, the outer casing houses both a refrigerator compartment and a freezer compartment.

The refrigerator/freezer compartment typically comprises a substantially box-like container, also known as inner liner, preferably made of a polymeric plastic material, such as PS polystyrene.

Associated with the cabinet is a cooling system operable to keep the interior of the compartment cold. The cooling system typically comprises a compressor, a condenser and one or more evaporators; the compressor, condenser and evaporators are in fluid communication by means of a piping and altogether form a closed hydraulic circuit, which is circulated through by a cooling agent.

The evaporators are preferably constituted by tubes made of a material having good thermal conductivity (such as aluminium or copper). The tubes are opportunely shaped to interact with the respective compartment to cool or freeze the same.

In some embodiments, the tube forming the evaporator externally wraps the walls defining the compartment or, in some further embodiments, the tube forming the evaporator is placed closed to, or connected to, a surface of said walls.

A prior method of securing or otherwise maintaining the tubes and walls in a desired relationship, comprises the use of a connecting element connected to a compartment wall and supporting the tube, such as shown in WO2009019268.

Further to said tubes, other components/objects are typically fixed to the compartment. For example, connectors boxes, light housings, fan reinforcements, water drains, are fixed on the inner surface of the compartment, throughout cuts or holes, and then foamed. Also, electrical wires are typically fixed to external walls of the compartment, for example electrical wires that supply voltage to a lamp inside the compartment or electrical wires in general for electrical components to be powered, for example the compressor, a control unit, a thermostat, etc.

In know refrigerators, furthermore, the space defined between outer casing and the compartment is preferably filled with an insulating material, for example a polyurethane foam, which enhances thermal insulation of the compartment. The insulating material is typically injected in the space after said various components/objects have been arranged at their desired positions.

According to the known art, as disclosed for example in WO2009019268, a connecting element is used to fix said objects to the compartment walls.

It is also known in the art the use of an adhesive tape and/or a thermos-shrinking tape to fix said objects to the compartment walls.

Assembling of the objects through said connecting elements and/or tapes is almost totally carried out manually by an operator.

Once the objects have been manually fixed at their desired positions, the insulating material is injected over the objects.

Manufacturing of refrigerators according to the known techniques, nevertheless, revealed some drawbacks.

A drawback of the manufacturing techniques of the known art is the complexity of the assembling steps needed to fix said objects to the compartment.

Another drawback of the manufacturing techniques of the known art is that they take a lot of time for the assembling steps.

These drawbacks further negatively affect manufacturing costs of the refrigerator.

The main object of the present invention is therefore to overcome said drawbacks.

It is an object of the invention to provide a method for assembling a cooling apparatus having a reduced complexity, and therefore is easier to assemble compared to known techniques.

It is another object of the invention to provide a method for reducing the assembling time of the cooling apparatus compared to known techniques.

It is a further object of the invention to provide a cooling apparatus with lower manufacturing costs compared to known techniques.

DISCLOSURE OF INVENTION

Applicant has found that by providing a method for assembling a cooling apparatus equipped with an inner casing defining at least one compartment for the storage of products to be cooled and one or more objects apt to be connected to said inner casing, wherein said method comprises a step of automatically univocally identifying the model of the inner casing among various known inner casing models and a step of connecting said one or more objects to the inner casing based on the model of inner casing identified in said identifying step, it is possible to reach the mentioned objects of the invention.

It is underlined that in this application the word "automatically", referred to a certain action, has to be read as performed autonomously by a robot, or more generally by a machine, without the need of a direct human intervention during the action; obviously this does not exclude a preliminary human intervention, for example for programming the machine so that the latter can perform the action without any other human intervention.

So, for example "automatically univocally identifying the model of the inner casing" means that the model of the inner casing is identified univocally by a machine (e.g. a robot) without an human intervention; in other words the machine itself identifies univocally the model of the inner liner.

In a first aspect thereof, the present invention relates, therefore, to a method for assembling a cooling apparatus comprising:
- a cabinet which houses an inner casing defining at least one compartment for the storage of products to be cooled;
- a cooling system for cooling said at least one compartment;
- one or more objects apt to be connected to said inner casing;
- wherein said method comprises the following steps:
- a) providing said inner casing;
- b) automatically univocally identifying the model of said inner casing among various known inner casing models by using a detecting device;
- c) performing a step of connecting said one or more objects to said inner casing based on the model of inner casing identified in said identifying step.

In a preferred embodiment of the invention, the step a) further comprises a step of providing the inner casing with a univocal identifier and the step b) comprises a step of automatically reading the univocal identifier using said detecting device, wherein the detecting device comprises an identifier reader.

According to a preferred embodiment of the invention, the univocal identifier comprises a univocal code associated to the inner casing.

Preferably, the univocal identifier is a univocal identifier of the group comprising: a QR code, a bar code, an RFID tag.

Preferably, the identifier reader is an identifier reader of the group comprising: a QR code reader, a bar code reader, a reader for RFID tag.

In a preferred embodiment of the invention, the step b) comprises a step of automatically recognizing the model of the inner casing using said detecting device, wherein the detecting device comprises a shape detecting device.

According to a preferred embodiment of the invention, the step c) comprises the step of automatically taking one of said one or more objects from a holder according to the model of inner casing identified in the identifying step by means of a robot station and automatically connecting said one object at the proper connecting position on the inner casing.

According to a further preferred embodiment of the invention, the step c) comprises the step of visually indicating the proper connecting position for said one or more objects on said inner casing by means of an optical pointer and manually connecting said one or more object at said proper connecting position on said inner casing.

In a second aspect thereof, the present invention relates to an assembling line for assembling a cooling apparatus comprising:
- a cabinet which houses an inner casing defining at least one compartment for the storage of products to be cooled;
- a cooling system for cooling said at least one compartment;
- one or more objects apt to be connected to said inner casing;
- wherein said line comprises:
- a supplying station of supplying said inner casing among various known inner casing models;
- a detecting device apt to give information for identifying the model of said inner casing among said various known inner casing models;
- a connecting station for connecting said one or more objects to said inner casing.

In a preferred embodiment of the invention, the supplying station and the connecting station are arranged at the same location or close one another.

According to a preferred embodiment of the invention, the connecting station further comprises at least one holder for receiving a plurality of said one or more objects.

In a preferred embodiment of the invention, the detecting device comprises an identifier reader for a univocal identifier.

Preferably, the identifier reader is an identifier reader of the group comprising: a QR code reader, a bar code reader, a reader for RFID tag.

In a further preferred embodiment of the invention, the detecting device comprises a shape detecting device.

According to a preferred embodiment of the invention, the connecting station comprises a robot station.

According to a further preferred embodiment of the invention, the connecting station comprises an optical pointer.

In a further aspect thereof, the present invention relates to an inner casing defining at least one compartment for the storage of products to be cooled in a cooling apparatus wherein said inner casing comprises a univocal identifier apt to be identified by a detecting device which gives information for univocally identifying the model of said inner casing among various known inner casing models.

BRIEF DESCRIPTION OF THE DRAWINGS

Further characteristics and advantages of the present invention will be highlighted in greater detail in the following detailed description of preferred embodiments of the invention, provided with reference to the enclosed drawings. In the drawings, corresponding characteristics and/or components are identified by the same reference numbers. In such drawings:

FIGS. 6 and 7 exemplary show assembling steps of the components of FIG. 2 in an assembling line according to a further preferred embodiment of the present invention.

DETAILED DESCRIPTION OF EXEMPLARY EMBODIMENTS OF THE INVENTION

The present invention has proved to be particularly advantageous when applied to a built-in cooling apparatus comprising compartments for storing the articles to be kept cool/freeze, like for example vegetables, fruit, dairy products, meat, beverages in bottles or cans, etc.

It should in any case be underlined that the present invention is not limited to this type of application. On the contrary, the present invention can be conveniently applied to other types of cooling apparatuses, like for example cooling apparatuses of free-standing type and/or with a different number of compartments for storing the articles.

Figure 1:
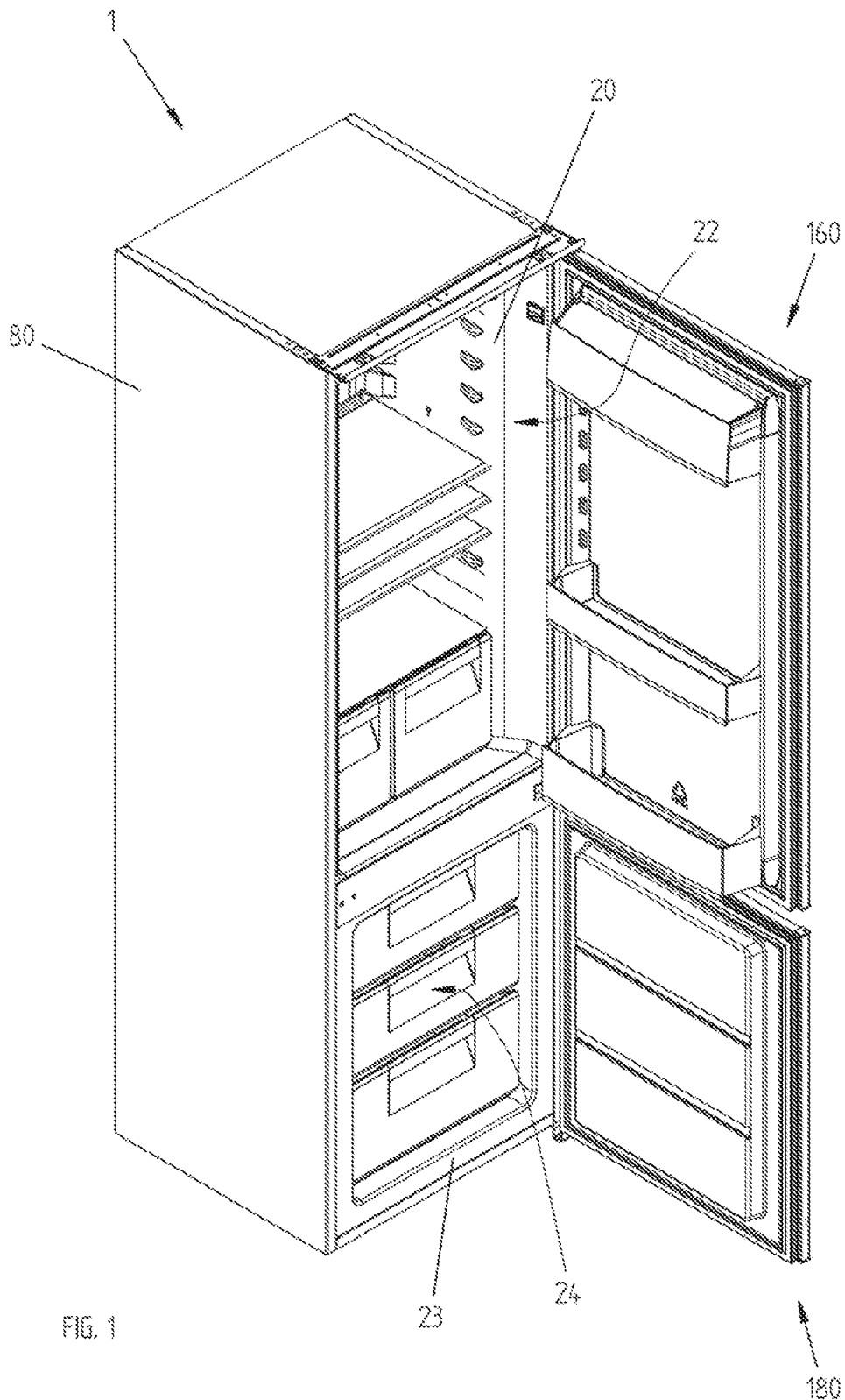
FIG. 1 shows a perspective view of a cooling apparatus manufactured with the method according to an embodiment of the present invention.

FIG. 1 shows a cooling apparatus 1, also typically known as refrigerator, according to a preferred embodiment of the invention.

The cooling apparatus 1 preferably comprises an outer casing 80, or cabinet, which houses an inner casing 20 defining a refrigerator compartment 22 and an inner casing 23 defining a freezer compartment 24.

Inner casings 20, 23 are also indicated with the term "inner liners".

The cooling apparatus 1 illustrated and described herein is a built-in type cooling apparatus 1 that is apt to be installed within a containment structure, not illustrated, like for example a kitchen cabinet. The cooling apparatus 1 is preferably secured to the structure by means of suitable connecting devices (not shown).

The cooling apparatus 1 further preferably comprises an upper door 160 associated with the refrigerated compartment 22 and a lower door 180 associated with the freezer compartment 24. In a variant embodiment, a single door may be provided for closing both compartments.

In different embodiments, not illustrated, the cooling apparatus may preferably comprise a different number and/or combination of refrigerator and/or freezer compartments, possibly even only one refrigerator or freezer compartment.

The number and/or shape and/or position of the refrigerator or freezer compartments mainly depend on the model of refrigerator eventually produced and marketed by the producer.

Refrigerator compartment 22 and freezer compartment 24 are preferably made of a polymeric plastic material, such as polystyrene (PS).

In the preferred embodiment illustrated, the two compartments 22, 24 are two separate elements, i.e. defined by two respective independent inner casings 20, 23. In different embodiments, not illustrated, the two compartments may be formed as a one-piece monolithic body, i.e. a single inner casing (or inner liner).

The refrigerator compartment 22 preferably has a substantially box-like shape comprising a rear wall 22a and a lateral wall 22b.

Analogously, the freezer compartment 24 preferably has a substantially box-like shape comprising a rear wall and a lateral wall, not visible in the Figures.

According to the specific model of cooling apparatus to be produced, therefore, it is necessary to provide the proper inner casing, or inner casings, which are selected among various inner casings available for the producer to produce the different models of cooling apparatus.

Figure 2:
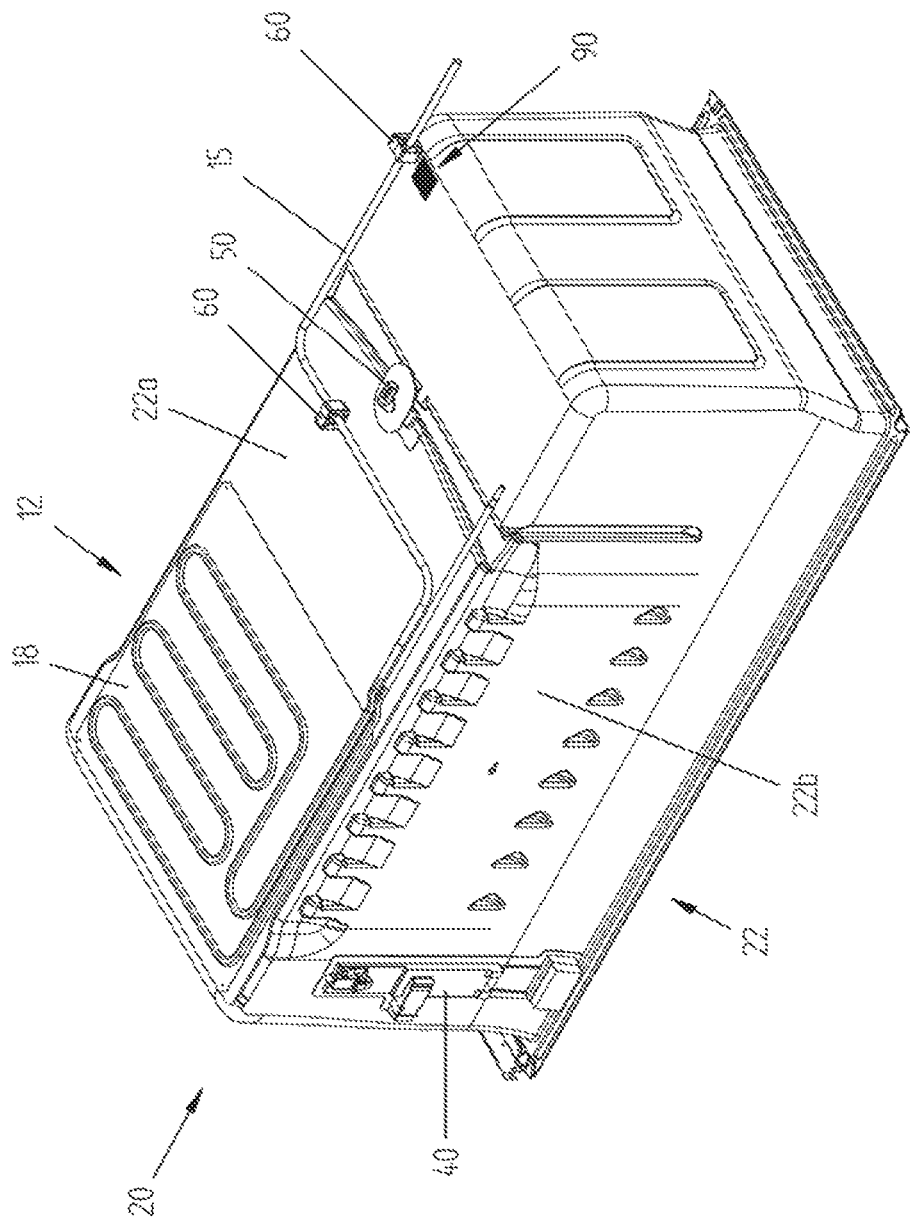
FIG. 2 shows some components of the cooling apparatus of FIG. 1 assembled according to a preferred embodiment of the method of the present invention.

The figures also show a plurality of objects, better illustrated in FIG. 2, which are preferably part of the cooling apparatus 1 and that need to be secured to the rear wall 22a of the refrigerator compartment 22 during manufacturing of the cooling apparatus 1.

In FIGS. 2 to 7, only the refrigerator compartment 22 and some objects to be secured to its rear wall 22a are shown.

It should in any case be underlined that in different embodiments, not illustrated, objects could be secured to any part of the refrigerator compartment 22, for example to its lateral wall 22b.

Furthermore, it should be underlined that what is described hereinafter for the refrigerator compartment 22 may advantageously apply to the freezer compartment 24.

The objects illustrated are only an example of some of the possible objects that can be used to manufacture a cooling apparatus and that need to be attached to the compartment, or the compartments.

Figure 3:
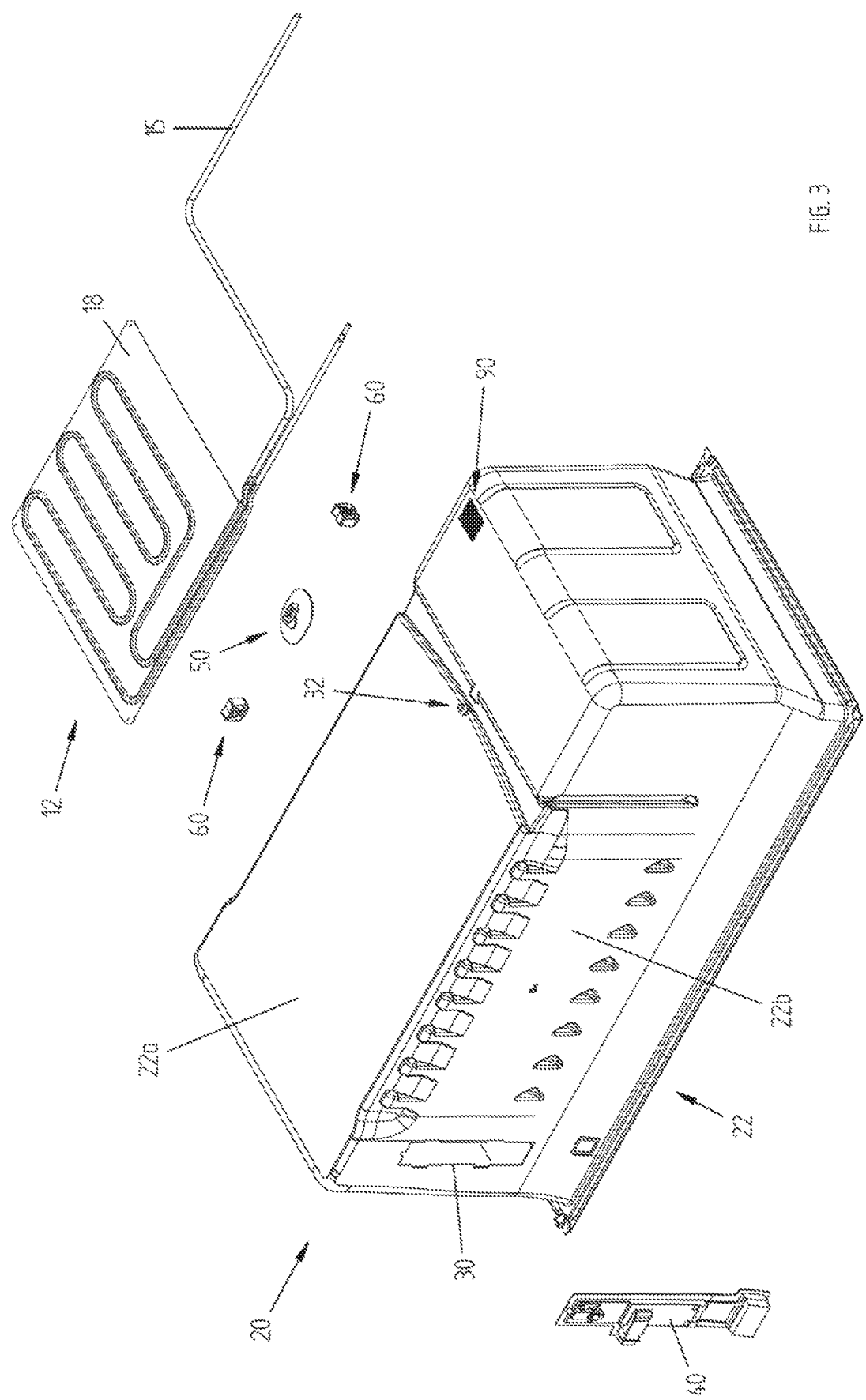
FIG. 3 shows an exploded view of FIG. 2.

The objects exemplary shown in FIGS. 2 and 3 preferably comprise:
- a light housing 40, preferably apt to be inserted in a respective hole 30 of the lateral wall 22b of refrigerator compartment 22;
- a drain connector 50 apt to be connected to a drain hose 32 located on the rear wall 22a of the refrigerator compartment 22;
- an evaporator 12, preferably apt to be connected to the rear wall 22a of the refrigerator compartment 22;
- a plurality of connecting elements 60, preferably apt to secure a tube 15 of the evaporator 12 to the rear wall 22a of the refrigerator compartment 22.

Connecting elements 60 may preferably be used to secure electrical wires, not shown, for example electrical wires that supply voltage to electrical components to be powered, for example a light, a compressor, a control unit, a thermostat, etc.

The evaporator 12 preferably comprises a supporting panel 18. The evaporator 12 is preferably glued to the supporting panel 18. The supporting panel 18 is preferably made of a thermal conducting material, preferably made of aluminium.

A further evaporator (not shown) is also preferably associated to the freezer compartment 24.

The evaporator 12, or evaporators, is part of a cooling system, not shown, advantageously operable to keep the interior of the refrigerator compartment 22 cold. The cooling system typically comprises a compressor, a condenser, one or more evaporators; the compressor, condenser and evaporators are in fluid communication by means of a piping, for example the tube 15, and altogether form a closed hydraulic circuit, which is circulated through by a cooling agent.

Further objects, not shown, that need to be attached to the inner casings 20, 23 of the cooling apparatus 1, i.e. attached to one or both the compartments 22, 24, may comprise, for example, connectors boxes, fan reinforcements, water drains, electrical wires, etc.

Figure 4:
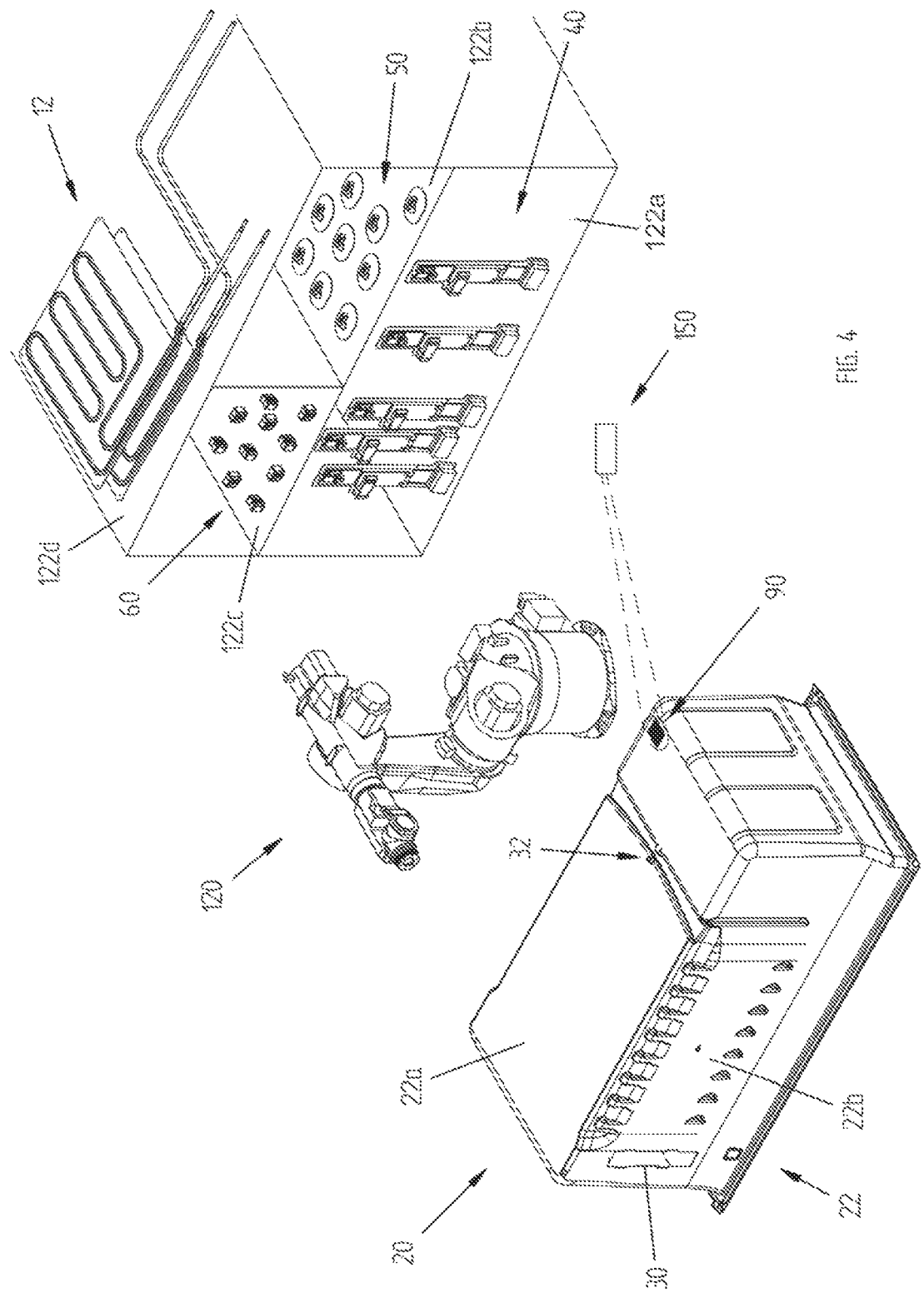
FIGS. 4 and 5 exemplary show assembling steps of the components of FIG. 2 in an assembling line according to a preferred embodiment of the present invention.
Figure 5:
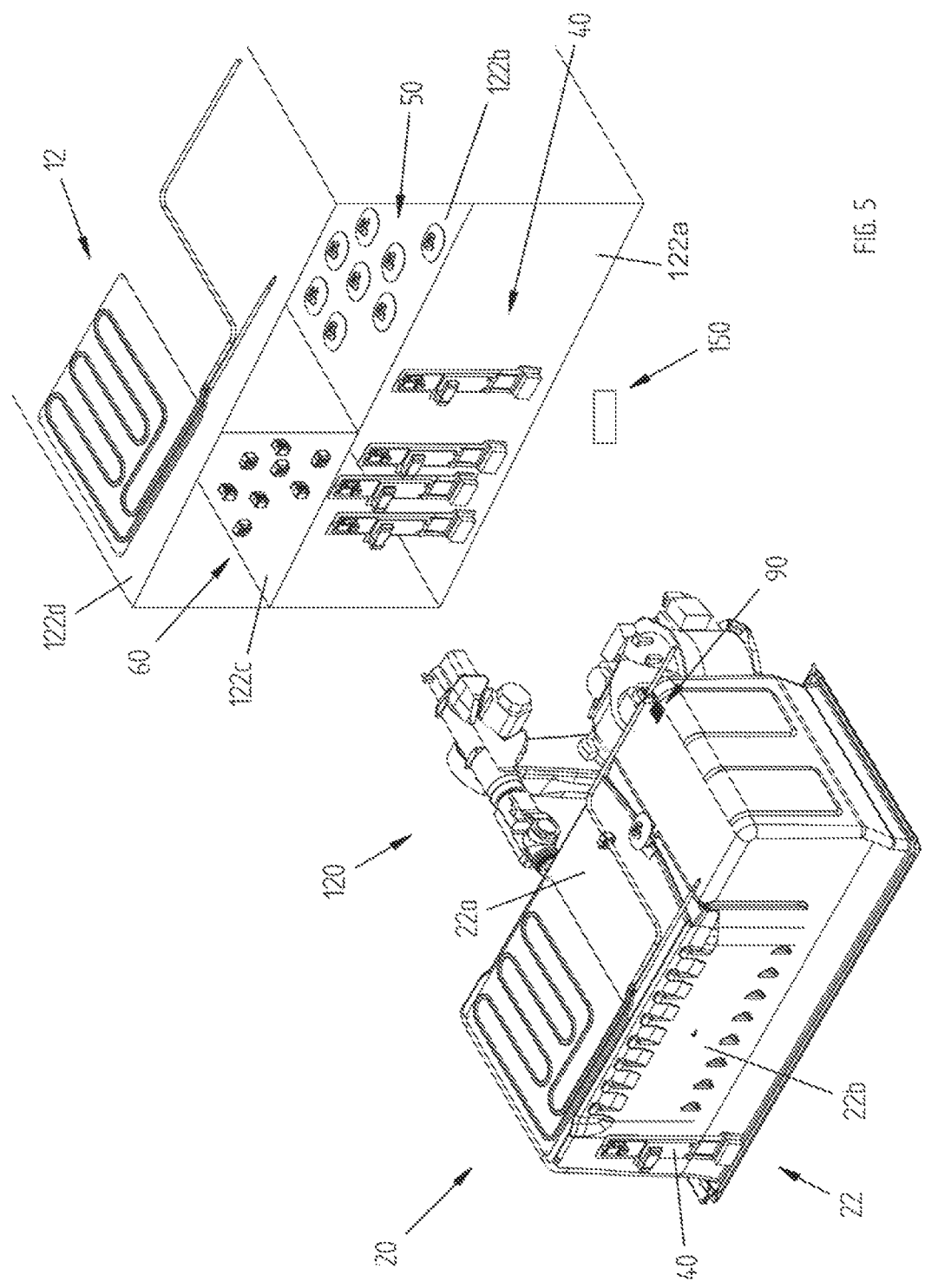

FIGS. 4 and 5 exemplary show some steps during manufacturing of the cooling apparatus 1 in an assembling line according to the invention. In particular, the figures exemplary show assembling steps of the objects 40, 50, 60, 12 to the refrigerator compartment 22.

As mentioned above, it should in any case be underlined that what is described hereinafter for the refrigerator compartment 22 may advantageously apply to the freezer compartment 24.

The assembling method carried out in the assembling line illustrated in FIGS. 4 and 5 is advantageously automatized.

The assembling line preferably comprises a first station, or supplying station, that supplies the inner casing 20 according to the model of cooling apparatus 1 to be produced.

The assembling line then preferably comprises a second station, or connecting station, that connects the objects 40, 50, 60, 12 to the refrigerator compartment 22.

The connecting station preferably comprises one or more robots 120 apt to automatically connect the objects 40, 50, 60, 12 to the refrigerator compartment 22.

The connecting station preferably comprises one or more holders 122a-122d, preferably containers, each containing a plurality of objects of the same type suited to be connected to the refrigerator compartment 22.

For example, a first container 122a contains a plurality of light housings 40, a second container 122b contains a plurality of drain connectors 50, a third container 122c contains a plurality of connecting elements 60, a fourth container (shelf) 122d contains a plurality of evaporators 12.

The connecting station and the suppling station are preferably arranged at a same location, or at close locations.

According to a preferred aspect of the present invention, the inner casing 20 comprises a univocal identifier 90.

The univocal identifier 90 allows to distinguish the actual inner casing 20 among various inner casings available for the producer to produce the different models of cooling apparatus.

In the preferred embodiment here illustrated, the univocal identifier 90 comprises a QR code.

Preferably, the QR code (or more generally the univocally identifier 90) may be printed directly on the inner casing 20, or printed on a label or sticker which is fixed to the inner casing 20.

In different embodiments, the univocal identifier may comprise different type of identifier, such as a bar code, an RFID tag, etc.

According to an advantageous aspect of the present invention, the assembling line is further provided with a detecting device 150. In the preferred embodiment here illustrated, the detecting device 150 comprises a QR code reader.

In different advantageous embodiments, the detecting device may be of different type and according to the univocal identifier of the inner casing. For example, the detecting device may comprise a bar code reader, a reader for RFID tag, etc.

Hereinafter, an advantageous example of the assembling process in the assembling line according to the invention is described.

The inner casing 20 with the univocal identifier 90 is provided by the supplying station. The detecting device 150 reads the univocal identifier 90 of the inner casing 20.

Output information from the detecting device 150 allows to distinguish the actual inner casing 20 among various inner casings available for the producer to produce the different models of cooling apparatus.

Output information are opportunely processed by a control unit (not shown) and used to control the robot 120, as it usually happens in an assembling line.

In particular, the robot 120 is opportunely driven to pick up the proper object 40, 50, 60, 12 from the respective container 122a, 122b, 122c, 122d.

For example, a light housing 40 is advantageously extracted from the first container 122a, inserted in the hole 30 of the refrigerator compartment 22 and fixed therein (for example by gluing, hot surface welding, ultrasonic welding, etc.); a drain connector 50 is extracted from the second container 122b and connected to the drain hose 32 located on back of the refrigerator compartment 22; two connecting elements 60 are extracted from the third container 122c and connected/glued to the rear wall 22a of the refrigerator compartment 22; an evaporator 12 is extracted from the fourth container 122d and connected to the rear wall 22a of the refrigerator compartment 22 while its tube 15 is secured in place by means of the connecting elements 60 previously assembled.

It is clear from above description, that assembling process of objects to the inner casing of the cooling apparatus is simplified compared to assembling system of known type.

The actual inner casing 20 is automatically identified among various inner casings as soon as the detecting device 150 reads the univocal identifier 90 associated to the same inner casing 20.

The connecting station then automatically connects the objects 40, 50, 60, 12 at their correct positions to the refrigerator compartment 22.

Preferably, the control unit drives the robot 120 on specific XYZ-coordinates to position the respective grasped object by the robot arm to the correct position on the refrigerator compartment 22.

XYZ-coordinates are preferably stored in a memory device of the control unit and different sets of XYZ-coordinates are stored according to the different possible models of inner casing that may be supplied to the assembling line.

Time necessary for recognizing the inner liner and for assembling objects thereof is therefore significantly reduced compared to assembling systems of known type.

Also manufacturing costs are then further reduced compared to known systems.

In the preferred embodiment above described, the inner casing is automatically identified among various inner casings by the detecting device which reads the univocal identifier associated to the same inner casing.

In a further preferred embodiment, the automatic identification among various inner casings is carried out through a shape detecting device which automatically detects the shape of the actual inner casing and distinguishes it from other different inner casings. In this case, the identifier for the inner casing may be omitted.

With reference to FIGS. 6 and 7 some steps during manufacturing of the cooling apparatus 1 in an assembling line according to a further preferred embodiment of the invention is described.

As for the previous embodiment, FIGS. 6 and 7 exemplary show assembling steps of the objects 40, 50, 60, 12 to the refrigerator compartment 22 according to this further preferred method.

The assembling method carried out in the assembling line illustrated in FIGS. 6 and 7 is advantageously partially automatized. An operator "0" carries out some manual operations, as better described in the following.

The assembling line still preferably comprises a first station, or supplying station, that supplies the inner casing 20 according to the model of cooling apparatus 1 that must be produced.

The assembling line then preferably comprises a second station, or connecting station, to connect the objects 40, 50, 60, 12 to the refrigerator compartment 22.

At this purpose, the connecting station preferably comprises one or more holders 122a-122d, preferably containers, each containing a plurality of objects of the same type suited to be connected to the refrigerator compartment 22, as described above.

The connecting station further preferably comprises at least one optical pointer 150a-150d. Each optical pointer 150a-150d preferably emits a beam of light towards a specific position on the external surface of the refrigerator compartment 22.

For example, a first optical pointer 150a emits a beam of light towards the hole 30 of the refrigerator compartment 22 to indicate the mounting position for the light housing 40; a second optical pointer 150b emits a beam of light towards the drain hose 32 located on back of the refrigerator compartment 22 to indicate the mounting position for the drain connector 50; a third optical pointer 150c emits two beams of light towards the rear wall 22a of the refrigerator compartment 22 to indicate the mounting positions of two respective connecting elements 60; a fourth optical pointer 150d emits a beam of light towards the rear wall 22a of the refrigerator compartment 22 to indicate the mounting position of the evaporator 12.

The connecting station and the suppling station are preferably arranged at the same location, or close one another.

According to an advantageous aspect of the present invention, the inner casing 20 comprises a univocal identifier 90, as previously described.

The univocal identifier 90 allows to distinguish the actual inner casing 20 among various inner casings available for the producer to produce the different models of cooling apparatus.

According to an advantageous aspect of the present invention, the assembling line is further provided with a detecting device 150, as previously described.

Hereinafter, the assembling process in the assembling line shown in FIGS. 6 and 7 according to the invention is described.

The inner casing 20 with the univocal identifier 90 is provided by the supplying station. The detecting device 150 reads the univocal identifier 90 of the inner casing 20.

Output information from the detecting device 150 allows to distinguish the actual inner casing 20 among various inner casings available for the producer to produce the different models of cooling apparatus.

Output information are opportunely processed by a control unit (not shown) and used to control the optical pointers 150a-150d.

Optical pointers 150a-150d help the operator O to connect the objects 40, 50, 60, 12 in the correct positions on the inner liner 20.

For example, the first optical pointer 150a is activated to emit a beam of light towards the hole 30 of the refrigerator compartment 22 to indicate the mounting position for the light housing 40. The operator O then takes a light housing 40 from the first container 122a, he inserts it in the illuminated hole 30 of the refrigerator compartment 22 and he fixes it (for example by gluing, hot surface welding, ultrasonic welding, etc.).

In a preferred embodiment, the operator O does not need any indication for taking the light housing 40 from the first container 122a and fixing it, since he may easily recognize that only the light housing 40 can be inserted in the illuminated hole 30.

In a further preferred embodiment, the first optical pointer 150a may emit a beam of light towards the hole 30 of the refrigerator compartment 22 to indicate the mounting position of the light housing 40 and the beam may also create an image, for example a number or a symbol, which can be univocally associated to the light housing 40 and/or the first container 122a.

The operator O is thus advantageously lead to take the light housing 40 from the first container 122a and to fix it in the right position.

For example, the beam may project the number "1" and the first container 122a may be marked with the same number "1".

The same then applies to other objects.

For example, the second optical pointer 150b is activated to emit a beam of light towards the drain hose 32 located on back of the refrigerator compartment 22 to indicate the mounting position of the drain connector 50. The operator O then takes a drain connector 50 from the second container 122b and connects it to the drain hose 32.

As explained above, the operator O may easily recognize that only the drain connector 50 can be connected to the illuminated drain hose 32.

In a further preferred embodiment, the second optical pointer 150b may project the number "2" and the second container 122a may be marked with the same number "2".

It is clear from above that assembling process of objects to the inner casing, or inner casings, of the cooling apparatus is simplified compared to assembling system of known type.

The actual inner casing 20 is automatically identified among various inner casings as soon as the detecting device 150 reads the univocal identifier 90 associated to the same inner casing 20.

The connecting station then helps the operator O to connect the objects 40, 50, 60, 12 at the correct positions to the refrigerator compartment 22.

Time necessary for recognizing the inner liner and for assembling objects thereof is therefore reduced compared to assembling system of known type Also manufacturing costs are then further reduced compared to known systems.

It has thus been shown that the present invention allows all the set objects to be achieved. In particular, it makes it possible to provide a method for assembling cooling apparatus which has a reduced complexity, and therefore easier to assemble, compared to known techniques.

The present invention has been here described in some of its possible embodiments, however those skilled in the art will recognize that several modifications to the described embodiments can be made, as well as other embodiments are possible, without departing from the protection scope defined in the appended claims.

The invention claimed is:

1. A method for assembling a cooling apparatus comprising:
   a cabinet which houses an inner casing defining at least one compartment for storage of products to be cooled;
   a cooling system configured to cool the at least one compartment; and
   a plurality of objects configured to be connected to the inner casing;
   wherein the method comprises:
   a) providing the inner casing for assembly in the cooling apparatus;
   b) automatically univocally identifying a model of the inner casing among various known inner casing models by using a detecting device;
   c) automatically retrieving at least one of the plurality of objects from a corresponding holder and a proper connecting position of the at least one of the plurality of objects based upon the identified model of the inner casing; and
   d) subsequent to providing the inner case, automatically univocally identifying the model of the inner casing and automatically retrieving the at least one of the plurality of objects, performing a step of connecting the at least one of the plurality of objects to the proper connecting position on the inner casing based upon the identified model of the inner casing.

2. The method according to claim 1, wherein the step a) further comprises providing the inner casing with a univocal identifier, and wherein the detecting device comprises an identifier reader.

3. The method according to claim 2, wherein the univocal identifier comprises a univocal code associated to the inner casing.

4. The method according to claim 2, wherein the univocal identifier comprises a QR code, a bar code, or an RFID tag.

5. The method according to claim 2, wherein the identifier reader comprises a QR code reader, a bar code reader, or an RFID tag reader.

6. The method according to claim 1, wherein the detecting device comprises a shape detecting device.

7. The method according to claim 1, wherein the step d) further comprises visually indicating the proper connecting position for the at least one of the plurality of objects to the inner casing by means of an optical pointer and manually connecting the at least one of the plurality of objects at the proper connecting position on the inner casing.

8. An assembling line for assembling a cooling apparatus, the cooling apparatus comprising:
   a cabinet which houses an inner casing defining at least one compartment for storage of products to be cooled;
   a cooling system configured to cool the at least one compartment; and
   a plurality of objects configured to be connected to the inner casing;
   wherein the assembling line comprises:
      a supplying station for supplying the inner casing among a variety of known inner casing models;
      a detecting device configured to detect an identifier located on the inner casing and automatically determine information, prior to an assembly of the cabinet with at least one of the plurality of objects, for identifying a model of the inner casing among the variety of known inner casing models and a proper connecting position of the at least one of the plurality of objects to the inner casing; and
      a connecting station for automatically retrieving the at least one of the plurality of objects from a corresponding holder and connecting the at least one of the plurality of objects to the proper position on the inner casing based on the determined information.

9. The assembling line according to claim 8, wherein the supplying station is at a same location as the connecting station.

10. The assembling line according to claim 8, wherein the connecting station further comprises at least one holder configured to receive the plurality of objects.

11. The assembling line according to claim 8, wherein the detecting device comprises an identifier reader for a univocal identifier.

12. The assembling line according to claim 11, wherein the identifier reader is a QR code reader, a bar code reader, or a RFID tag reader.

13. The assembling line according to claim 8, wherein the detecting device comprises a shape detecting device.

14. The assembling line according to claim 8, wherein the connecting station comprises a robot station.

15. The assembling line according to claim 8, wherein the connecting station comprises an optical pointer.

16. An inner casing defining at least one compartment for storage of products to be cooled in a cooling apparatus, wherein the inner casing is assembled with at least one of a plurality of objects on an assembly line for assembling the cooling apparatus, wherein the inner casing comprises: a univocal identifier configured to be identified, prior to the assembling the inner casing with the at least one of the plurality of objects, by a detecting device configured to determine information for univocally identifying a model of the inner casing among a variety of known inner casing models and a proper connecting position of the at least one of the plurality of objects to the inner casing, and wherein the at least one of the plurality of objects are automatically retrieved from a corresponding holder and automatically connected to the proper connecting position on the inner casing based on the determined information.

* * * * *